United States Patent
Watanabe et al.

[11] Patent Number: 6,016,490
[45] Date of Patent: Jan. 18, 2000

[54] DATABASE MANAGEMENT SYSTEM

[75] Inventors: Yoshiki Watanabe; Kei Tanaka; Hiroshi Hayata, all of Nakai-machi, Japan

[73] Assignee: Fuji Xerox Co., Ltd.

[21] Appl. No.: 09/016,487

[22] Filed: Jan. 30, 1998

[30] Foreign Application Priority Data

Feb. 5, 1997 [JP] Japan .................................... 9-036993
May 6, 1997 [JP] Japan .................................... 9-131690

[51] Int. Cl.$^7$ .................................................. G06F 17/30
[52] U.S. Cl. ................................ 707/8; 707/10; 707/104
[58] Field of Search .................... 707/8, 10, 104

[56] References Cited

U.S. PATENT DOCUMENTS

| | | | |
|---|---|---|---|
| 5,430,850 | 7/1995 | Papadopoulos et al. | 395/375 |
| 5,745,747 | 4/1998 | Chang et al. | 707/8 |
| 5,778,365 | 7/1998 | Nishiyama | 707/9 |
| 5,826,253 | 10/1998 | Bredenberg | 707/2 |
| 5,832,484 | 11/1998 | Sankaran et al. | 707/8 |
| 5,835,906 | 11/1998 | Hagersten et al. | 707/8 |
| 5,870,765 | 2/1999 | Bauer et al. | 707/203 |
| 5,872,981 | 2/1999 | Waddington et al. | 395/726 |
| 5,878,434 | 3/1999 | Draper et al. | 707/202 |
| 5,890,153 | 3/1999 | Fukuda et al. | 707/8 |
| 5,893,912 | 4/1999 | Freund et al. | 707/103 |
| 5,893,913 | 4/1999 | Brodsky et al. | 707/201 |

*Primary Examiner*—Thomas G. Black
*Assistant Examiner*—Frantz Coby
*Attorney, Agent, or Firm*—Oliff & Berridge, PLC

[57] ABSTRACT

A database management system for preventing deadlocks from occurring during control while securing execution rights and securing locks, for efficiently operating the application program in a multi-thread environment, and also for limiting the amount of time wasted in standby during synchronous processing for maintenance of execution rights. In this system, once the execution rights to the threads corresponding to a cache resource have been secured, a lock is secured on a transaction operated on a thread secured by an exclusive controller for a resource of a database corresponding to a resource in the cache resource. When a lock cannot be secured for a particular transaction, the exclusive controller informs the synchronization processor of a lock failure the previously secured execution right is automatically discarded so that execution rights to other threads in standby can be secured. In this way deadlocks regarding to control of thread operation are prevented from occurring. Furthermore, execution rights are synchronously processed for each group of exclusive control process data of the lock, and data groups independent of each other in exclusive control are synchronously processed without a standby state.

12 Claims, 13 Drawing Sheets

DATABASE MANAGEMENT SYSTEM

BACKGROUND OF THE INVENTION

1. Field of the Invention

The present invention relates to a database management system for exclusive control to secure a lock on transactions and for securing execution rights for threads for a resource in a multi-thread environment.

2. Description of Related Art

A functionality referred to as the multi-thread is recently being widely used in operating systems. In this multi-thread environment, the virtual memory space of a plurality of multi-threads are used in common and the multi-threads are capable of parallel operation. Utilizing this kind of multi-threads typically provides the following listed effects so that multi-thread functions are effectively employed in database management systems requiring a plurality of simultaneous transactions.

One effect is improved throughput, in which thread processing provides improved throughput in response to numerous asynchronous requests occurring such as to file servers.

A second effect is improved response, in which requests from users are allocated to threads for improved response so that applications such as utilizing GUI (graphical user interfaces) do not have to be stopped.

A third effect is utilization of the multiprocessor, in which, in SMP systems having a plurality of processors, thread processing is allocated to each processor to make high speed calculation possible.

A fourth effect is conservation of memory resources, in which the threads commonly share the text zones, data zones, and heap zones inside an identical process area so that the necessary memory resources are available for running a plurality of tasks.

However, because each thread makes common use of the virtual memory space, synchronizing is needed to allow operation only of threads having execution rights from a synchronization processor in order that synchronization between threads is realized.

Figure 13:
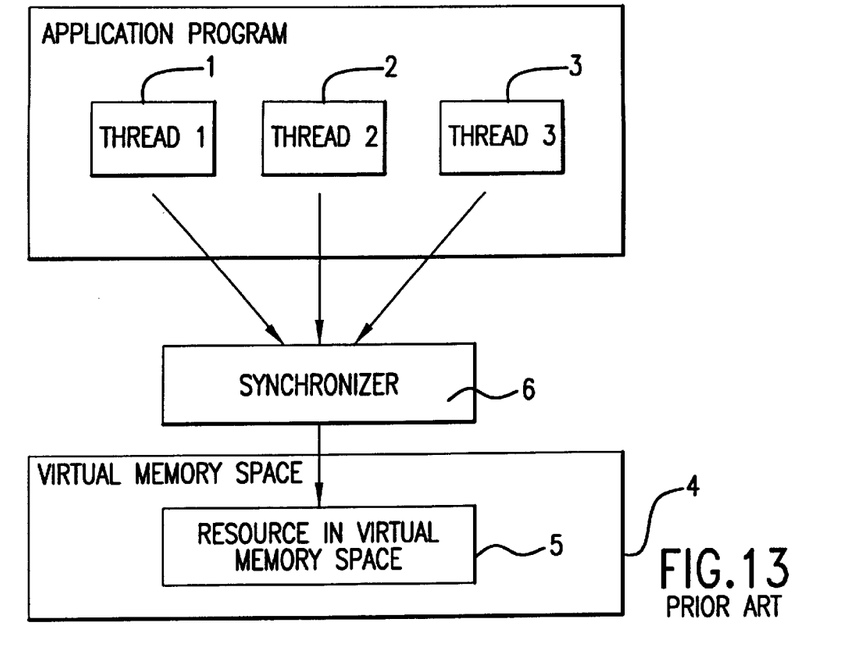
FIG. 13 is a block diagram showing synchronous processing in the database management system of the conventional art.

FIG. 13 shows update processing performed by threads 1, 2, and 3 of an application program 3 on identical data 5 (hereafter called the resource in the virtual memory space) of a virtual memory space 4. Access from each thread 1 through 3, to the resource 5 is performed by way of the synchronization processor 6. This synchronization processor 6 assigns execution rights in sequence so that the threads will operate to perform simultaneous update processing without conflicting with other threads.

Database management systems on the other hand are conventionally provided with an exclusive type control arrangement called a transaction. Accordingly, in order to configure a database management system of multithreads, the synchronizing of these threads and the exclusive control of transactions must be made to work in cooperation with each other.

Figure 14:
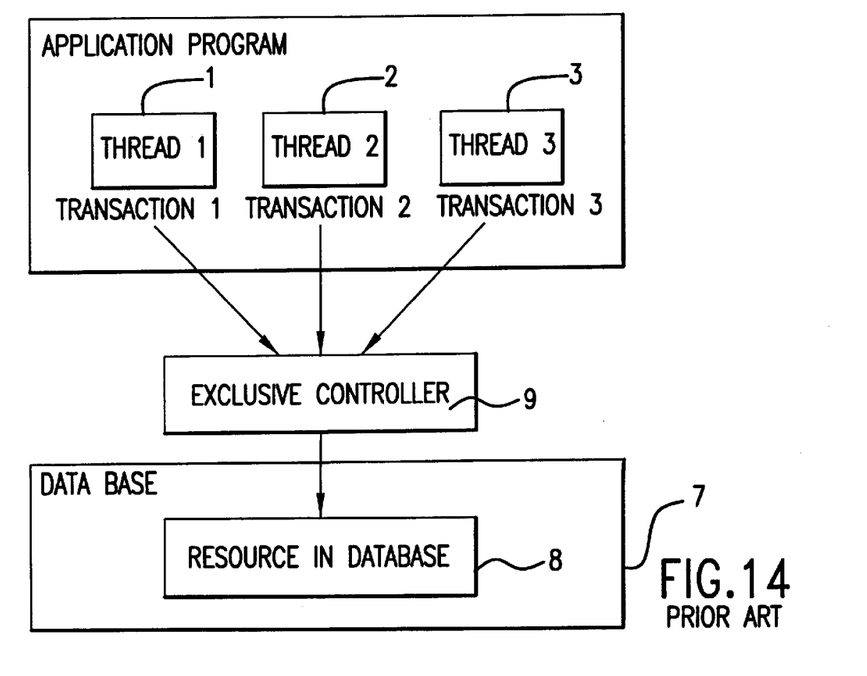
FIG. 14 is a block diagram showing exclusive control in the database management system of the conventional art.

FIG. 14 shows processing for differing transactions for each of threads 1, 2 and 3 of the application program 3 on the identical data 8 (hereafter called the database resource) of the database 7. An exclusive controller 9 obtains access to the database resource 8 by means of each transaction, and data is updated without conflicts among the threads, by the exclusive controller 9 assigning read and write rights to operate transactions in sequence.

Here, the database resource is loaded into the virtual memory space (cached) and operated as a resource in the virtual memory space (in other words a cache resource). Permission must be granted by both the synchronization processor and the exclusive controller in order to operate this cache by executing a transaction with a thread.

A method is known in the conventional art for cooperative operation of the transaction and the thread in the "ObjectStore C++API User Guide, Release 4, pp14–pp117." This document lists a method for cooperatively operating a transaction and a thread without permitting other thread transactions during the transaction process and also lists an operating method for processing all threads within the same transaction.

However, the former of these methods has the drawback that until a transaction is complete, a separate transaction can in no way be executed even if the transaction process has commenced, which in turn reduces thread ability to operate in parallel. Further, in the latter of the above two methods, one transaction can operate a plurality of threads, however the threads cannot commence a new transaction while the current transaction is in progress so that the ability of transactions to operate in parallel also decreased.

Further, Japanese Published Unexamined Patent Application No. Hei 7-84851 describes a control method for handling common data, using an object oriented database management system for common use of a plurality of threads of a database resource. In this method, the common data is assigned to threads having different virtual storage regions (pages in the embodiment) so that thread synchronization was unnecessary.

However, when a plurality of threads are operated in this method, the securing of numerous virtual memory storage zones is required and the actual memory space becomes compressed during simultaneous execution. Moreover, when a plurality of data is operated by a plurality of threads, the same data must be loaded into the virtual memory storage zones of each thread presenting the problem that the same data cannot be used efficiently in common by a plurality of threads.

These proposed methods therefore all had the drawbacks of not being able to operate threads efficiently or in parallel, in a database resource used as a cache resource in virtual memory space, when a plurality of threads were utilized for processing different transactions.

This drawback is the cause of the deadlock problem occurring between the synchronization processor for the threads and the transaction by the exclusive controller. When the database resource is loaded into the cache resource of the virtual memory space, the cache resource is then shared among the threads. A thread obtains execution rights from the synchronization processor when it is operating a cache resource. Also, when the securing of a lock on a database resource corresponding to a cache resource from the exclusive controller in needed, a deadlock occurs when securing of execution rights and securing of a lock cannot be smoothly and efficiently controlled.

Figure 15:
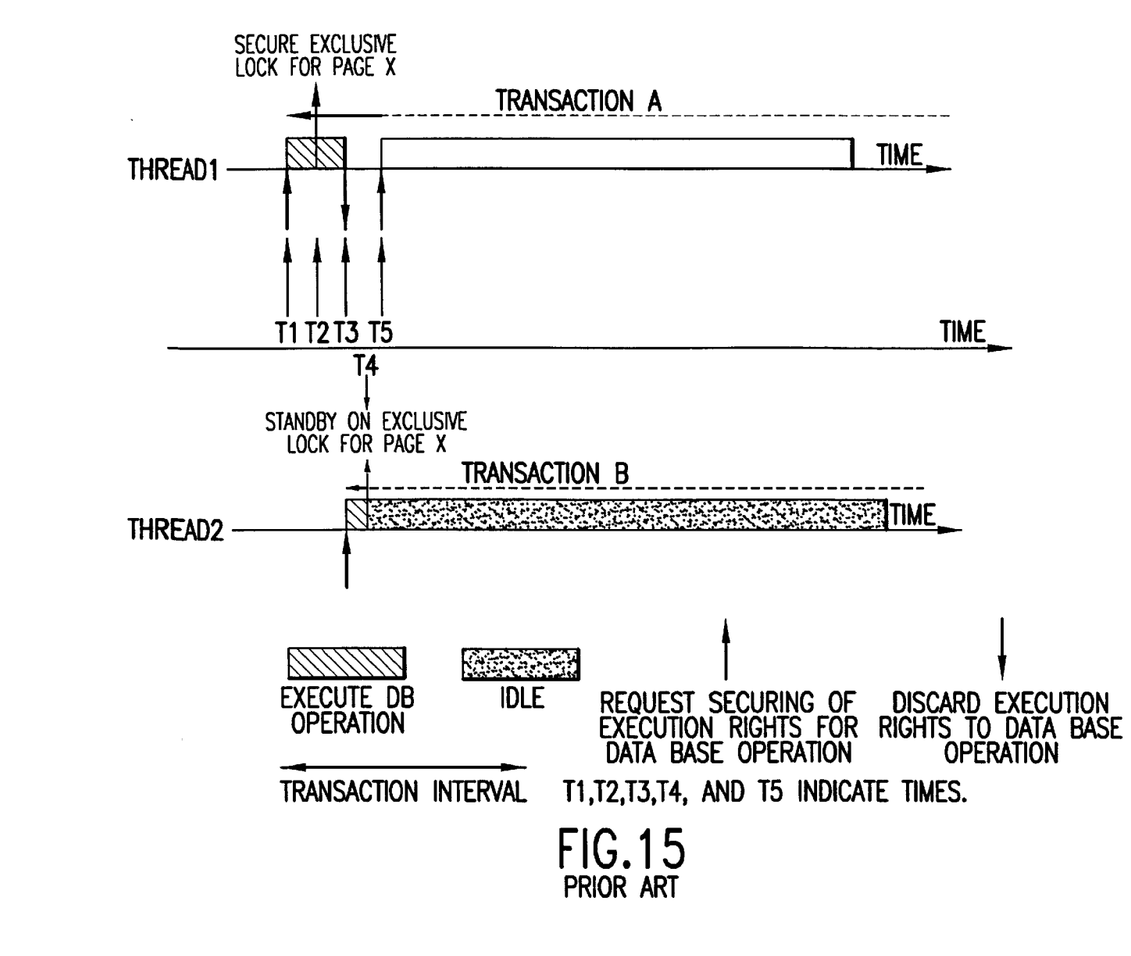
FIG. 15 is a timing chart showing a deadlock occurring between synchronous processing and exclusive control.

The conditions causing a deadlock to occur are described in FIG. 15.

At time T1, a thread 1 receives execution rights from the synchronization processor for the cache resource. At time T2, a transaction A for thread 1 obtains an exclusive lock on the cache resource (page X). Then, at time T3, the thread 1 discards the execution rights and at this point the thread T2 which had been in standby to receive execution rights, now receives the execution rights.

Then at time T4, when a transaction B of the thread 2 requests an exclusive lock to page X, the exclusive controller sets the thread 2 to lock standby on account of the continued lock by transaction A. At time T5 when thread 1 again operates to request that execution rights be secured, the execution rights are still secured by the thread 2 so that the synchronization processor sets thread 1 to standby for execution rights. Therefore, at time T5, with the thread 1 in standby for execution rights, the thread 2 sets to standby for lock so that a deadlock has now occurred.

SUMMARY OF THE INVENTION

In view of the above, it is therefore an object of the present invention to provide a database management system to make the thread synchronization and the exclusive control of the transaction work in conjunction and in which the application program functions efficiently in a multi-thread environment.

Another object of the present invention is to prevent occurrence of standby during synchronization processing and improve parallel processing performance in a multi-thread environment by performing synchronized thread processing for each exclusive control transaction.

In order to achieve the above objects, in the database management system of the present invention, once the execution rights to the threads versus the cache resource have been secured, a lock is secured on transactions operated for threads secured by an exclusive controller for a resource corresponding to a cache resource in a database. When a lock cannot be secured for a particular transaction, the exclusive controller informs the synchronization processor of a lock failure, and the synchronization processor automatically discards previously secured execution rights according to the lock failure information.

Consequently, the occurrence of deadlocks is prevented and other threads in standby can now secure execution rights.

Also, the database management system of the present invention is comprised of objects which have a synchronization process function for securing exclusive execution rights to any thread corresponding to a cache resource and an exclusive control function to secure a lock on transactions operated by threads whose execution rights have been secured for a database resource corresponding to a cache resource, and said system also automatically secures exclusive execution rights to a thread for said synchronized object whose resource has been locked by said exclusive control object.

In other words, by providing a synchronous control object at each exclusive controlled resource, cooperative exclusive control can be performed in individual units on exclusive resources and on controlling execution rights to threads. Thus, when a plurality of threads are accessing individual resources not dependent on exclusive control, execution rights can be speedily obtained for each thread without the synchronization processor placing a transaction in standby.

BRIEF DESCRIPTION OF THE DRAWINGS

FIGS. 12A–12C are three drawings describing the operation process of the third embodiment of the present invention.

DETAILED DESCRIPTION OF THE PREFERRED EMBODIMENTS

An embodiment for the object-oriented database management system of the present invention is explained next while referring to the drawings.

Figure 1:
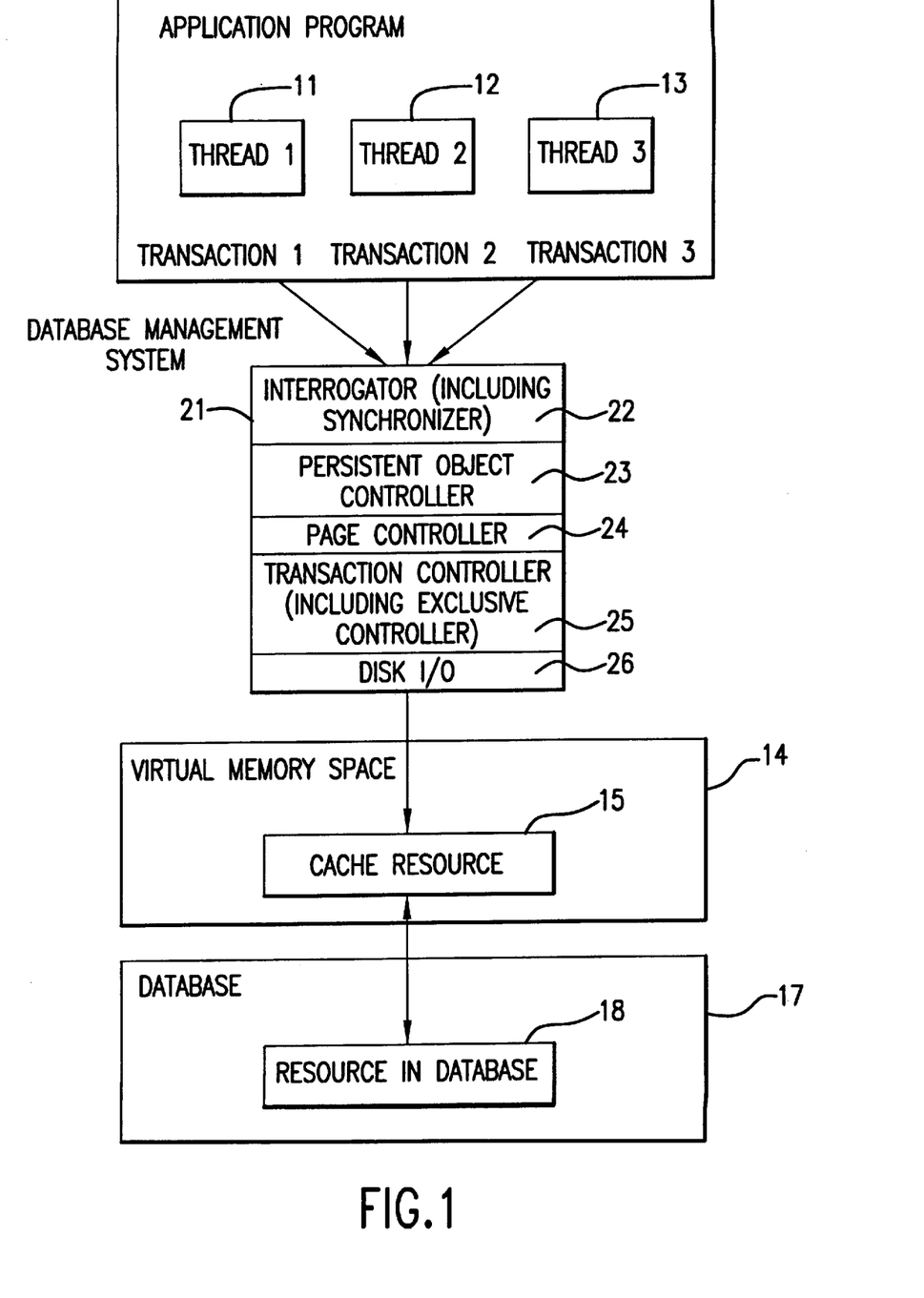
FIG. 1 is a block diagram showing the layout of the database management system of the first embodiment of the present invention.

FIG. 1 shows the layout of the database management system of the first embodiment. A resource 18 in the database 17 is handled as a cache resource 15 of a virtual memory space 14. The three threads 11, 12, and 13 of the application program each operate a different transaction in parallel in the cache resource 15 maintained in the virtual memory source 14.

A database management system 21 has an interrogator 22, a persistent object controller 23, a page controller 24, a transaction controller 25, and a disk I/O 26. The interrogator 22 contains a synchronization processor for securing thread execution rights and the transaction controller 25 has an exclusive controller for securing a lock for transactions. In other words, this synchronization processor is a submodule of the interrogator 22 for accepting processing requests from the application program. The exclusive controller is a submodule of the transaction controller 25 for implementing transactions as processing of the application program.

Figure 2:
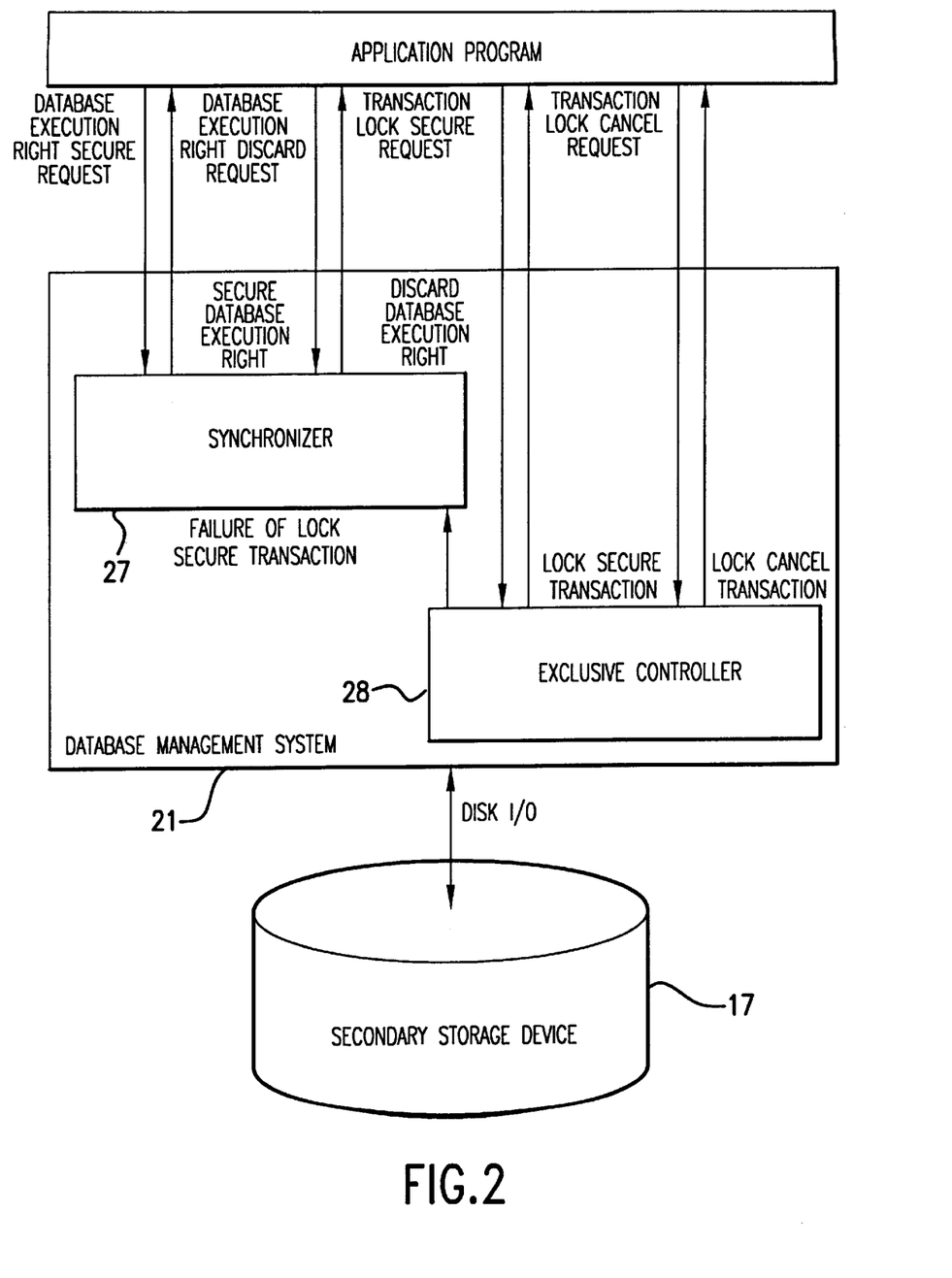
FIG. 2 is a block diagram showing essential portions of the database management system of the first embodiment of the present invention.

The synchronization processor 27, along with securing execution rights to the cache resource in response to an execution right secure request from the application to the thread as shown in FIG. 2, also discards execution rights to the cache resource in response to an execution right discard request from the application program. The exclusive controller 28, along with securing a lock on a resource of database 17 in response to a lock securing request from the application to the transaction, also discards (or cancels) the lock in response to a lock discard request from the application program to the transaction.

When the exclusive controller 28 fails to secure a lock, this lock failure information is reported to the synchronization processor 27, and previously obtained execution rights are discarded by the synchronization processor 27 in response to this lock failure information.

In other words, in order to operate the database 17 from the operation program threads, first of all, the synchronization processor 27 secures the execution rights to the thread. Next, the application program that obtained the operation execution rights obtains, from the exclusive controller 28, a lock on the required page (cache resource) needed to perform the thread transaction. When this lock cannot be obtained, the exclusive controller 28 reports the lock failure information to the synchronization processor 27. Operation execution rights to previously secured threads are then discarded by the synchronization processor 27.

In the example shown in FIG. 2, the synchronization processor uses the necessary resource unit of the overall database file and also the exclusive controller utilizes the necessary resource unit of the pages comprising the database file. Restated, the above related one cache resource corresponds to the one page cached in the virtual memory space. In order to operate this one page, the operate execution right of the database file has to be secured from the synchronization processor 27; and a lock on the pages from the exclusive controller 28 has to be secured.

Figure 3:
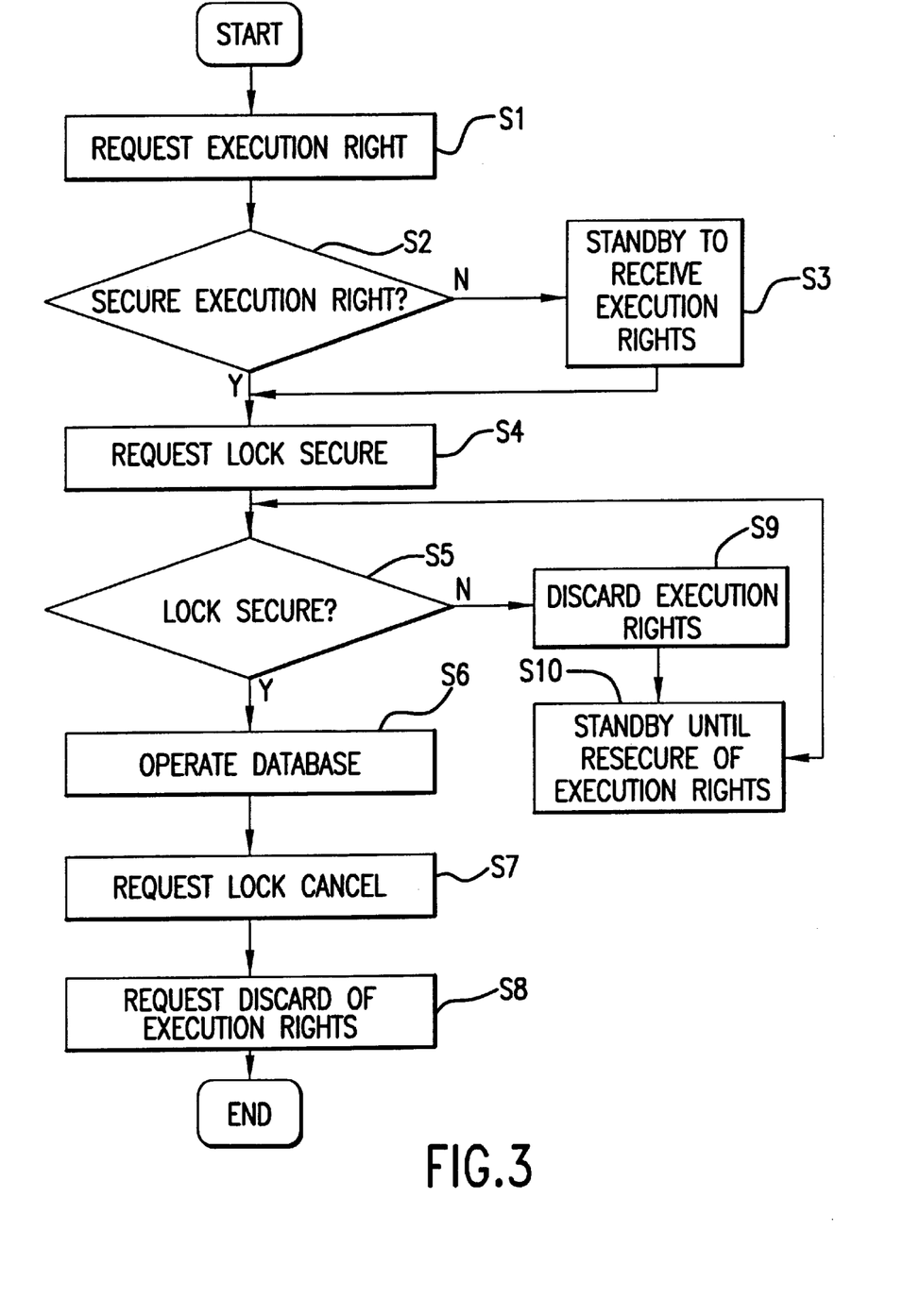
FIG. 3 is a flowchart showing the parallel control process sequence of the database management system of the first embodiment of the present invention.

FIG. 3 shows the process sequence for lock and execution rights performed mainly by the synchronization processor 27 and the exclusive controller 28.

FIG. 3 shows processes of execution rights and locks to be performed mainly by the synchronization processor 27 and the exclusive controller 28.

When the application program requests data file operating rights for a thread (Step S1), the synchronization processor 27 responds to the request and secures the execution rights (Step S2). If at this point the operation execution rights cannot be secured, the applicable thread is set to standby until execution rights are obtained and when execution rights of other threads whose operation in the data file is finished are discarded, execution rights of the applicable thread are finally secured (Step S3). When operation execution rights in a database to a thread have been discarded, an appropriate thread is selected from among the other threads in standby for operation execution rights and the execution rights are provided to that thread.

When the operation execution rights of a thread to the database are secured as a result of the above process, the exclusive controller 28 is requested to secure a lock on the necessary page for operating the applicable thread (Step S4).

When the exclusive controller 28 receives the page lock secure request, a lock is then secured on that page. When the lock can be secured (Step S5), a database operation is implemented for the originator of the transaction request for that page (Step S6). When that database operation is complete, the exclusive controller 28 receives the lock discard request from the transaction and performs the lock discard process (Step S7). Further, the synchronization processor 27 receives the request to discard operation execution rights and proceeds to discard those execution rights (Step S8).

However, in the process for securing the lock (Step S5) described above, when the exclusive controller 28 cannot secure a lock on the required page, the exclusive controller 28 informs the synchronization processor 27 with failure information on trying to secure the page lock. The synchronization processor 27 responds to this failure information by automatically discarding database operation execution rights previously obtained for threads performing page lock (step S9). The exclusive controller 28 then sets the thread lock secure request from the transaction to a standby condition (Step S10) until the thread again receives database execution rights. Once the applicable thread has again secured execution rights, processing to secure a lock on the target page is again attempted.

Accordingly, when a lock cannot be secured with the above process, execution rights can be granted to other threads in order to make the applicable thread automatically dispose of previously obtained execution rights and thus prevent a deadlock situation from occurring.

Figure 4:
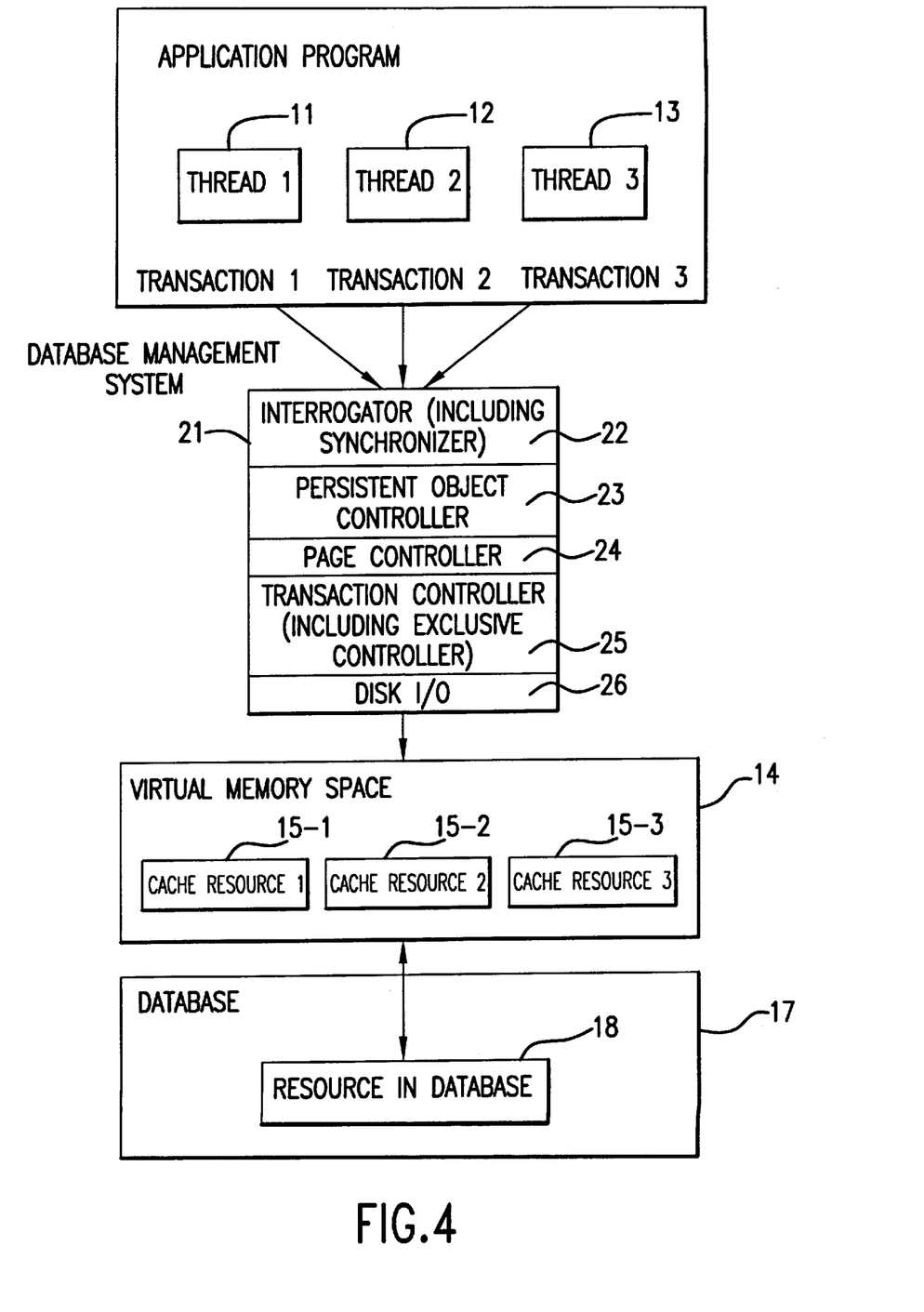
FIG. 4 is a block diagram showing essential portions of the database management system of the present invention.

The present invention is of course applicable to cases where for instance a plurality of cache resources 15-1, 15-2, and 15-3 are maintained in a virtual memory space 14 as shown in FIG. 4. In such cases, the following two process sequences can be employed for securing execution rights and securing locks.

In the first method, the execution rights for these cache resources 15-1, 15-2, and 15-3 are secured one by one, and locks secured on when the execution rights have been obtained. When a lock cannot be secured, the execution rights are secured for other threads after discarding execution rights for a thread whose lock cannot be secured.

In the second method, after securing the execution rights for all the cache resources 15-1, 15-2, and 15-3, a lock is secured on all of these cache resources. When a lock cannot be secured subsequent execution rights are discarded. For instance, when a lock cannot be secured on cache resource 15-2, the execution rights to the cache resource 15-2 and the subsequent cache resource 15-3 are discarded.

When attempts to secure a lock for any of the resource fail in the above procedures, the lock failure information reported to the synchronization processor 27 from the exclusive controller 28 contains resource ID (identification) information that specifies the resource where the lock failed. The synchronization processor 27 can then discard execution rights to the specified thread based on this ID information.

Figure 5:
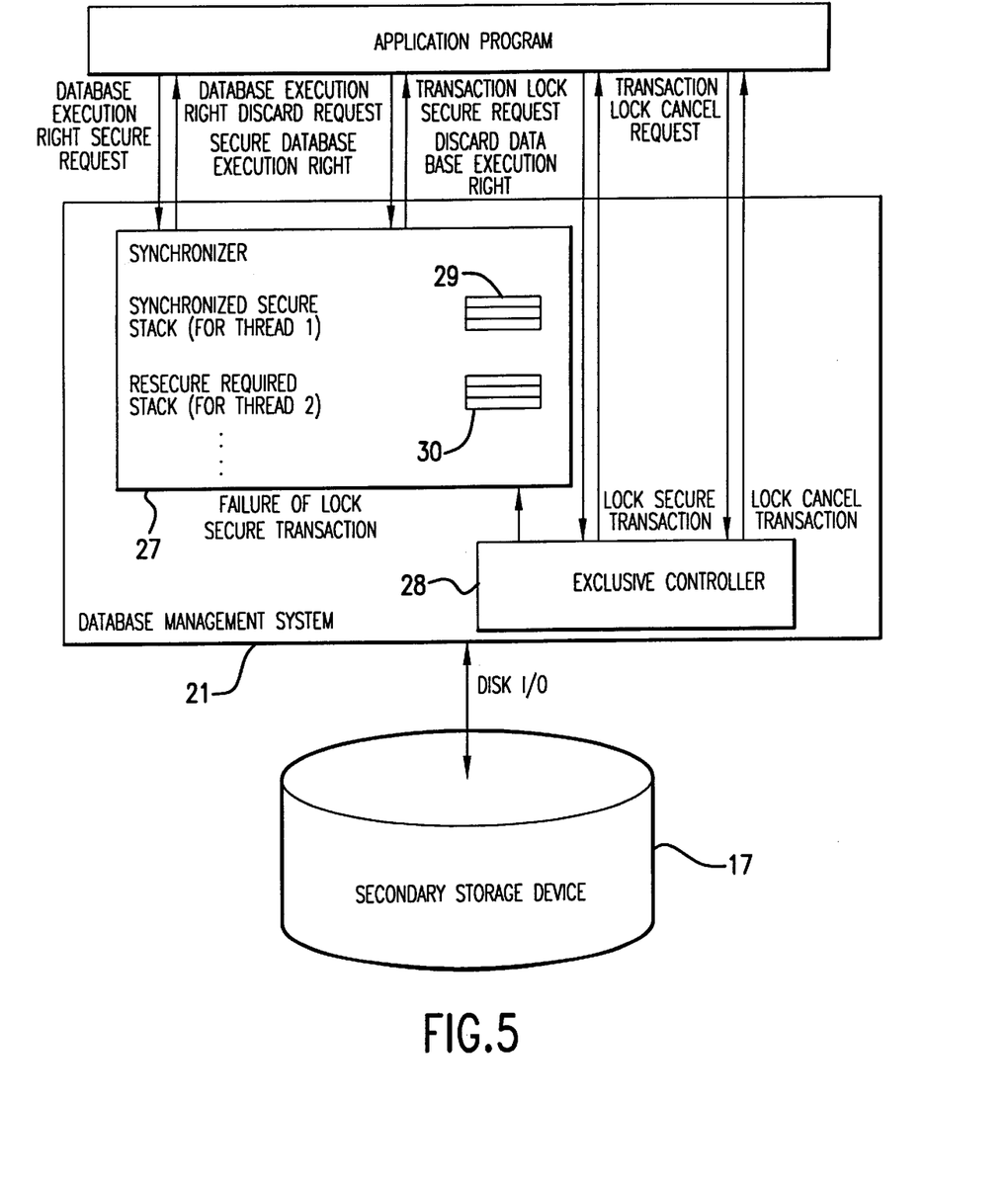
FIG. 5 is a block diagram showing essential portions of the database management system of the second embodiment of the present invention.

The structure of the second embodiment of the database management system of the present invention is shown in FIG. 5. In this embodiment, the resources needed for synchronizing and exclusive control are handled in smaller units. For instance, the synchronizing and exclusive control resource units consist of objects which are database file elements. These objects are minimal particle clusters of variable length expressed as separate physical objects.

In this embodiment, a situation is assumed where the operation execution rights are secured for a plurality of objects with the exclusive controller 28 in lock standby. Accordingly, the process for securing execution rights by the synchronization processor 27 and the process for securing locks by the exclusive controller 28 are different from those of the first embodiment.

The synchronization processor 27 of this embodiment contains a synchronized secure stack 29 and a resecure required stack 30 for each thread. Information on secured objects whose thread execution rights are secured is stored in the synchronized secure stack 29 and information on objects whose required execution rights were not secured during the lock secure process is stored in the resecure required stack 30.

In other words, the execution right secure status of objects for each thread is controlled by the stacks 29 and 30.

Figure 6:
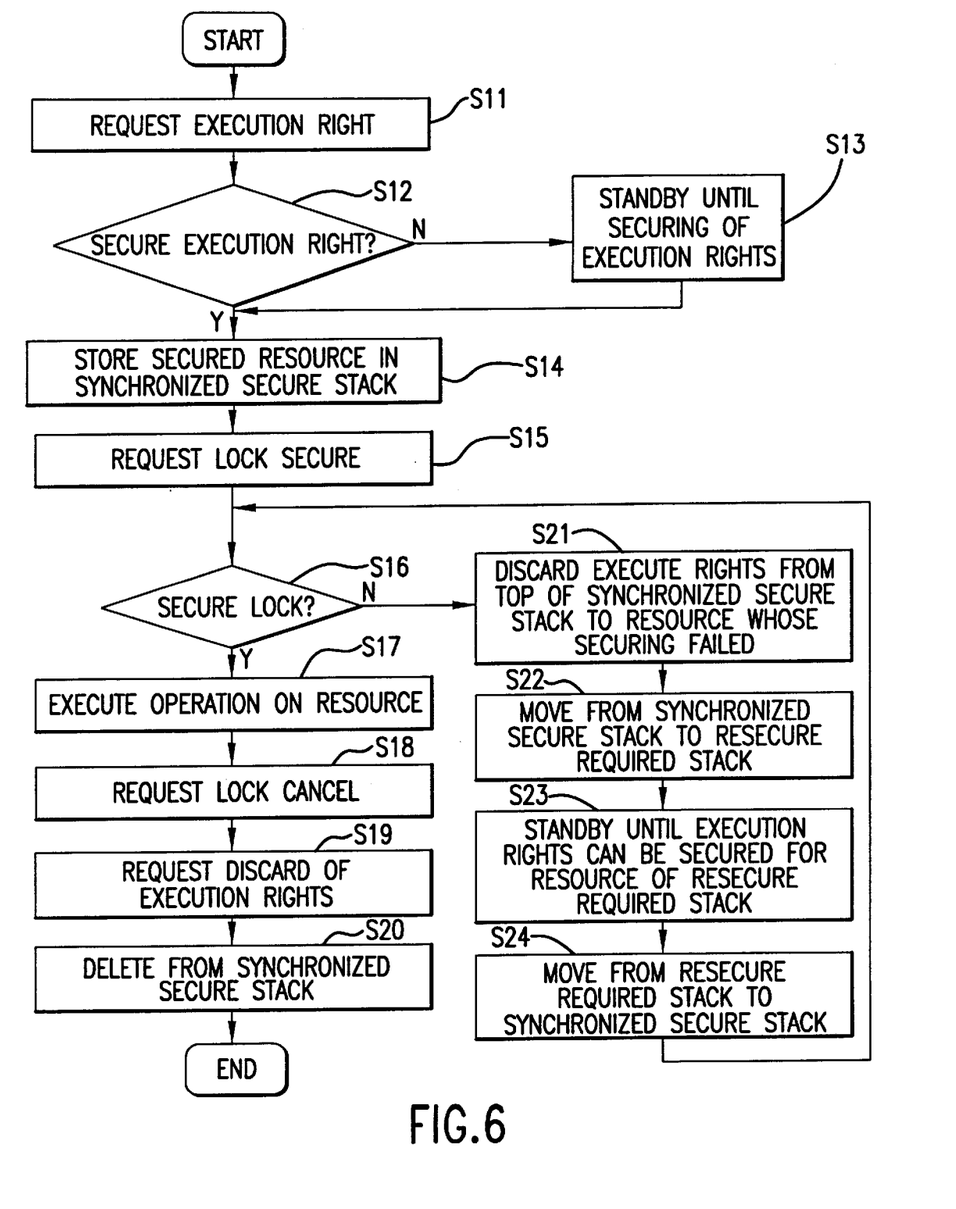
FIG. 6 is a flowchart showing the parallel control process sequence of the database management system of the second embodiment of the present invention.

The process sequence for lock and for execution rights performed mainly by the synchronization processor 27 and the exclusive controller 28 of this embodiment is shown in FIG. 6.

When the application program requests object execution rights for a thread (Step S11), the synchronization processor 27 responds by securing the execution rights (Step S12). In cases when the operation execution rights cannot be secured at this point, the applicable thread is set to standby until execution rights can be secured and when other threads for which execution rights were previously provided have completed operations for the object and discarded their execution rights, then the execution rights can finally be secured for the applicable thread (Step S13). When a thread has discarded the object execution rights, a suitable thread from among the other threads in standby for operation execution rights is then granted the execution rights.

As a result of the above process, when operation execution rights to the object for the corresponding thread, the information on the object for which execution rights have now been secured is stored in the synchronized secure stack 29 for each thread by the synchronization processor 27 (Step S14).

Afterwards, a request to secure a lock (Step S15) for the object needed to operate the applicable thread is made to the exclusive controller 28. When the exclusive controller 28 receives the request to secure a lock for the applicable object, a lock on that object is secured. When the lock can be secured (Step S16), the lock on that object for the transaction is secured and operation on the object is executed (Step S17). Then, at the point where the object operation is complete, the exclusive controller 28 receives the lock discard request and proceeds to discard the lock (Step S18). Further, when the synchronization processor 27 receives the discard request for operation execution rights (Step S19), the corresponding object information is extracted and erased from the synchronized secure stack 29 and the process for discarding operation execution rights (Step S20) is performed.

However, in the above lock secure process (Step 16) when the exclusive controller 28 is unable to secure a lock on the required object, the exclusive controller 28 reports the lock failure information including the corresponding object information for the synchronization processor 27. In response, the synchronization processor 27 then extracts the object information stored in the thread's synchronized secure stack 29 corresponding to the attempted object lock, and the applicable execution rights are automatically discarded (Step S21). Since, in this embodiment, the securing of execution rights and locks is performed by means of the above related second process sequence, the extraction and the discarding of execution rights from this synchronized secure stack 29 are performed within a range from the top of the applicable stack 29, to the object whose lock was a failure (in other words, items subsequent to the object whose lock was a failure).

Next, the object information extracted from the synchronized secure stack 29 is resecured in the resecure required stack 30 by the synchronization processor 27 (Step 22). Afterwards, the synchronization processor 27 sets the thread to standby (Step 23) until the operation execution rights are secured for the object whose thread matches the object information stored in the resecure required stack 30 (Step S23). At the point where operation execution rights can be secured by discarding other thread operation execution rights, the corresponding object information inside the rese- cure required stack 30 is moved for storage in the synchronized secure stack 29 (Step S24), and the previously attempted lock securing process is tried once again.

Accordingly, by means of the above process, deadlocks can be avoided since previously held execution rights to the applicable thread are automatically discarded when a lock cannot be secured and execution rights are granted to other threads. Further, the thread that was made to discard these execution rights is placed in standby in the resecure required stack 30 and the synchronization processor and exclusive controller work efficiently to continually implement securing of locks matching numerous resources when the execution rights have been resecured.

Figure 7:
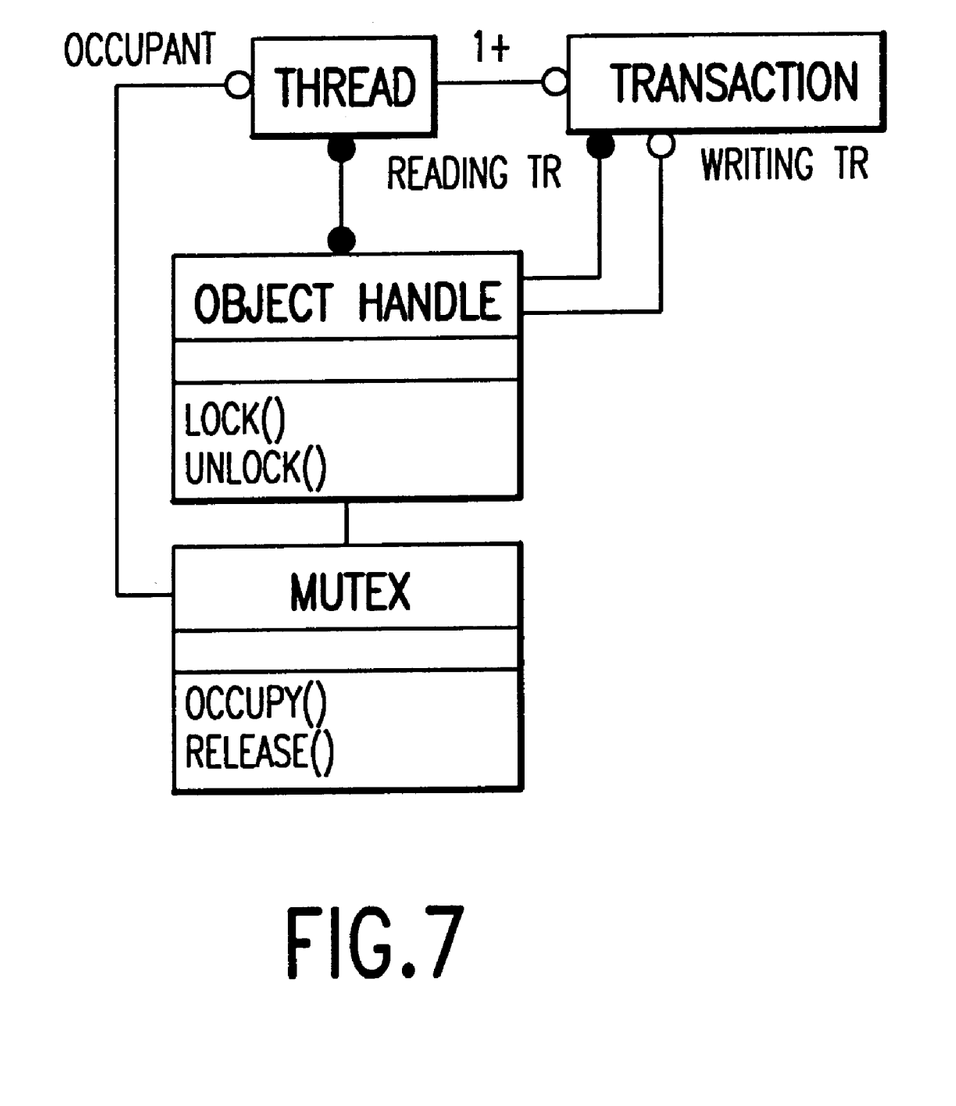
FIG. 7 is a block diagram showing the layout of the database management system of the third embodiment of the present invention.

The structure of an object-oriented database management system of the third embodiment of the present invention is shown in FIG. 7.

In this embodiment, the function for synchronizing thread execution rights and the function for exclusive control of locks on a transaction, are configured as objects. The units of data such as objects, pages, segments and clusters comprising the elements of the database file are set as resource (units) for performing synchronization and exclusive control. Further, the process for exclusively granting execution rights to the threads of the objects for synchronizing is performed with data units that secure the lock on the exclusive control object. The example below describes the units for performing synchronization and exclusive control as data objects.

The threads are comprised of object threads. Though not shown in the drawing in FIG. 7, an object thread is present for each thread. Also, the transactions which are a collection of processes for the database are comprised of object transactions. These object transactions have functions for starting and finishing of transactions.

The exclusive control function for transactions is comprised of an object handle. This object handle has the function of operating the data (in this example, data objects) stored in the database. In other words, it has, as functions to operate the data object, a function lock( ) to apply a lock to the data object and a function unlock( ) to release the lock on the data object.

The thread synchronizing function is comprised of an object Mutex. These object Mutex are present in units of one each, for each object handle and have the function of controlling thread execution rights for an object handle. In other words, the object Mutex has a function occupy( ) to acquire execution rights for an object handle and has a function release( ) to discard this execution right.

Figure 8:
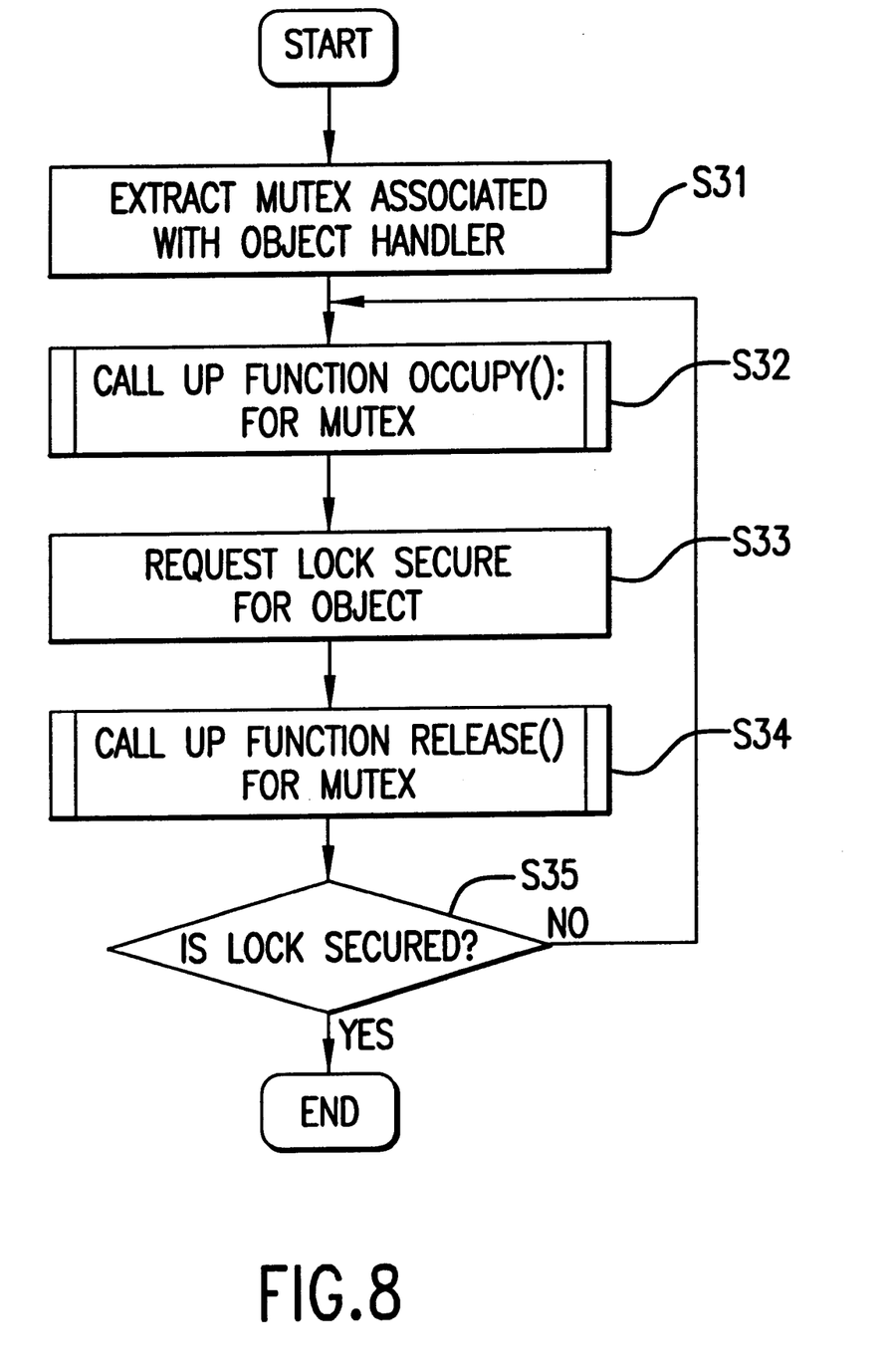
FIG. 8 is a flowchart showing the lock securing process sequence of the third embodiment of the present invention.

The process sequence for the object handle function lock( ) is shown in FIG. 8.

When attempting to secure a lock on a data object with the object handle for a transaction of a thread, first the object Mutex associated with the applicable object handle is extracted (Step S31). Next, the function occupy( ) is called up (Step S32) for the corresponding object Mutex that was extracted and the execution rights acquired by the applicable object handle just for the data object whose lock is attempted.

Next, a request for lock of the data object is made with the object handle (Step S33). At this point only the request for a lock is made. Whether a lock is actually acquired or not depends on whether a lock was secured on that data object by a transaction of another thread.

Next, the function release( ) for the object Mutex is called up (Step S34) and the execution rights secured for the object handle are discarded. Then, whether or not a lock in the previous process (Step S33) was secured is confirmed (Step S35). When the lock was in fact secured the process ends as is, however if the lock was not secured, operation returns to the process for acquiring execution rights (Step S32) and the above process repeats until a lock can be secured.

Thus, the function lock( ) is utilized to perform lock secure requests, secure execution rights, and discard execution rights for the same data object (resource) of identical size.

Figure 9:
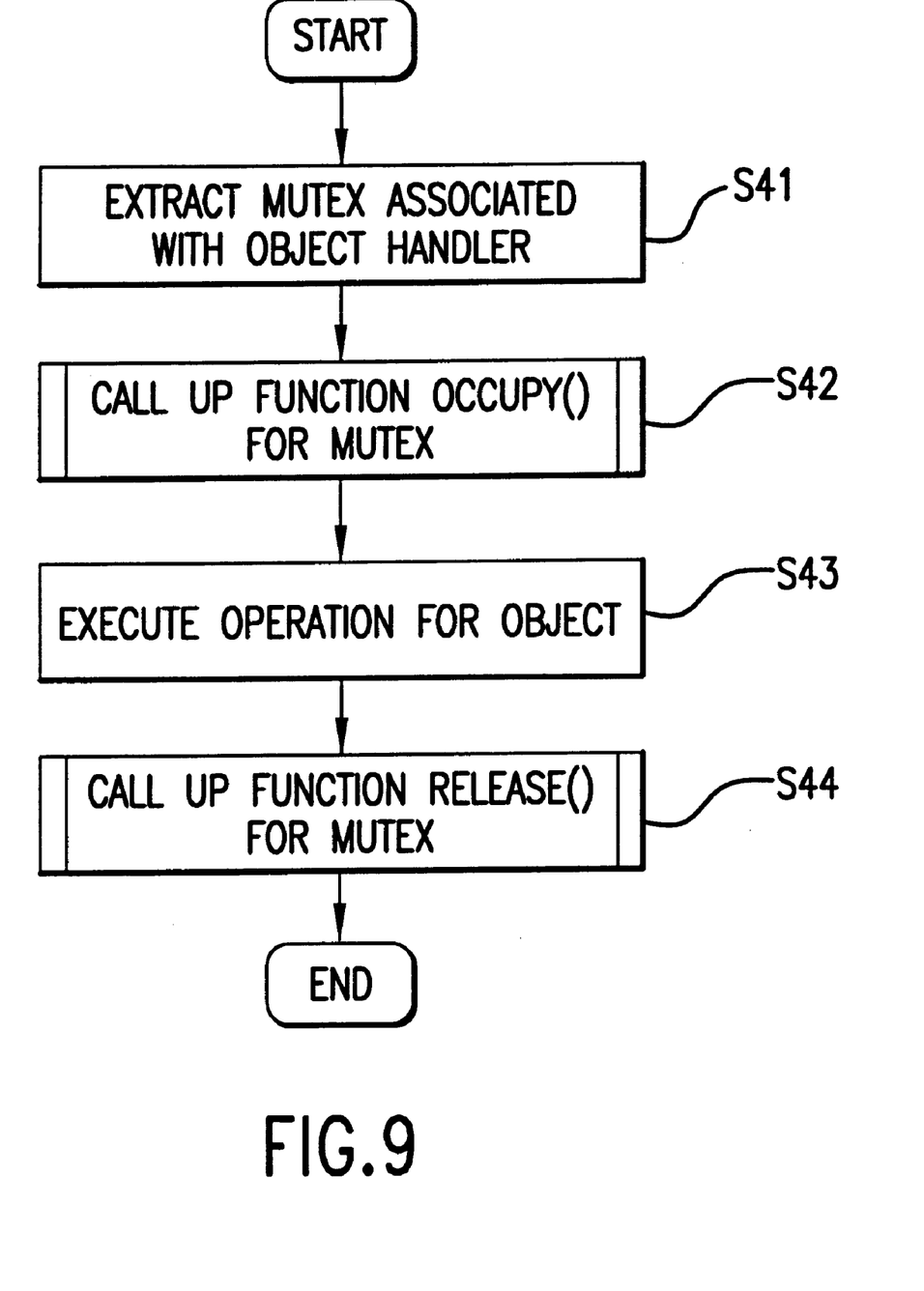
FIG. 9 is a flowchart showing the lock cancel process sequence of the third embodiment of the present invention.

The process sequence for the object handle function unlock( ) is shown in FIG. 9.

When discarding a secured lock per said lock request, first the object Mutex associated with the applicable object handle is extracted (Step S41). Next, the function occupy( ) is called up (Step S42) for the corresponding object Mutex that was extracted and the execution rights are acquired by the applicable object handle just for the data object whose lock is to be discarded.

Next, after performing the required operation for the locked data object, the process to release the lock on the applicable data object is performed (Step 43). Then the function release( ) for said object Mutex is called up and the execution rights granted for the applicable object handle are discarded (Step 44).

Thus, the function unlock( ) is utilized to perform lock release, secure execution rights, and discard execution rights for the same data object (resource) of an identical size.

Figure 10:
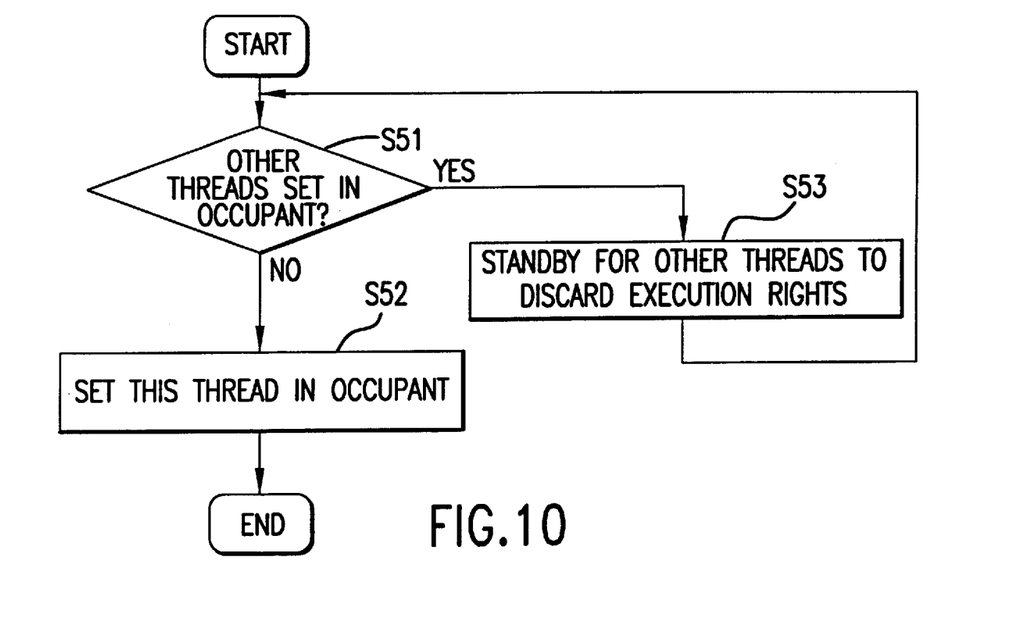
FIG. 10 is a flowchart showing the execution right securing process of the third embodiment of the present invention.

The process sequence performed in the above Steps S32 and S42 for the object Mutex function occupy( ) is shown in FIG. 10.

When the object Mutex function occupy( ) is called up, a check is made as an occupant variable of the applicable function occupy( ), as to whether object thread settings other than relating to the lock secure and lock discard processes have been made (Step S51).

As a result, if other thread settings have not been made, then other threads holding execution rights for object handles associated with the applicable object Mutex do not exist, so the thread acquires execution rights per the applicable process just for the data object for the applicable lock secure or lock discard process. In other words, the thread object relating to the applicable process is set (Step S52) as the variable occupant.

However, if other thread object settings are found, then these other applicable threads have previously secured execution rights so a standby condition (S53) is set until these threads discard their execution rights. The process in Step S52 is then performed at the point when the execution rights have finally been discarded.

Here, the steps from setting the variable occupant (Step S51) to setting the occupant thread in the variable occupant (Step S52) must always be implemented as one continuous process and during this process the operation of other thread objects must be prohibited.

The implementation of this execution right can be expressed for instance as a synchronized method or synchronized block from Java which is one object-oriented language. Also, the Java wait function can be used to express the discarding of other thread execution rights relating to Step S53.

Figure 11:
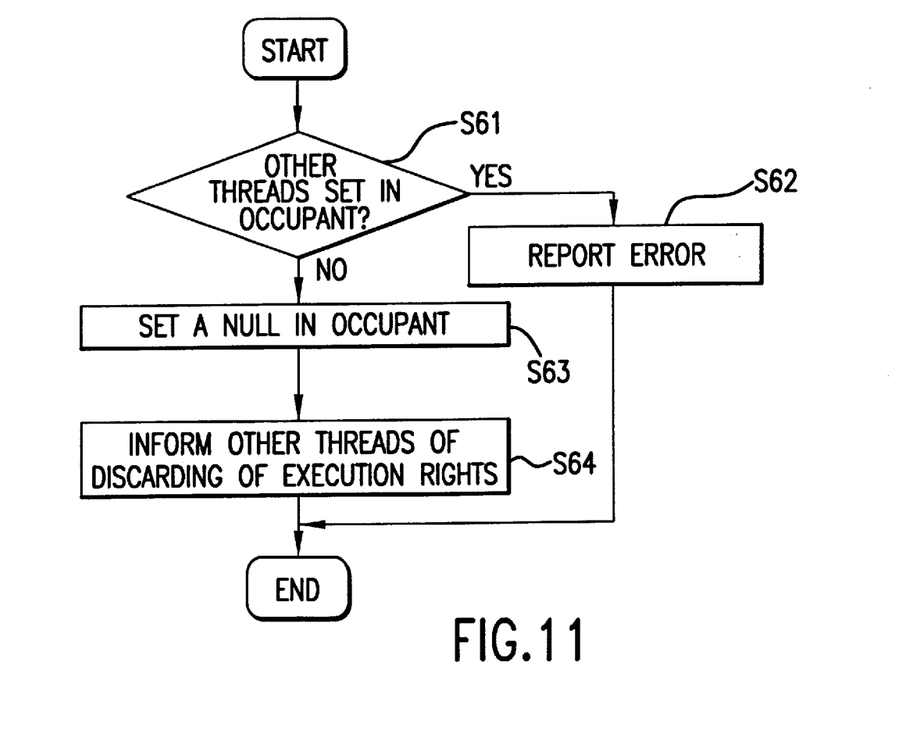
FIG. 11 is a flowchart showing the execution right discard process of the third embodiment of the present invention.

The process sequence performed in the above Steps S34 and S44 for the object release function occupy( ) is shown in FIG. 11.

When the object Mutex function release( ) is called up, a check is made as an occupant variable of the applicable function release( ), as to whether object thread settings other than relating to the lock secure and lock discard processes have been made (Step S61). In other words, as a measure to detect errors in this process step, a check is made as to whether the thread currently holding execution rights is the thread that is executing the function release( ).

As a result, if an object setting for another thread has been made, then the callup is reported as an error and the process is ended (Step S62).

However, if other thread object settings are not found, then the callup is correct. Therefore, by setting the variable occupant to null, only the execution right for the data object relating to the applicable lock secure or lock discard process is discarded (Step S63). The discarding of execution rights (Step S64) is then reported at other threads attempting to secure execution rights relating to the object Mutex, so that execution rights to the applicable thread can then be secured.

Here, in this linked process just as with the function occupy( ), the steps must always be implemented as one continuous process and during this process the operation of other thread objects must be prohibited. The process for reporting the discarding of execution rights to other threads can be expressed, for instance, with the Java notify function.

Figure 12:
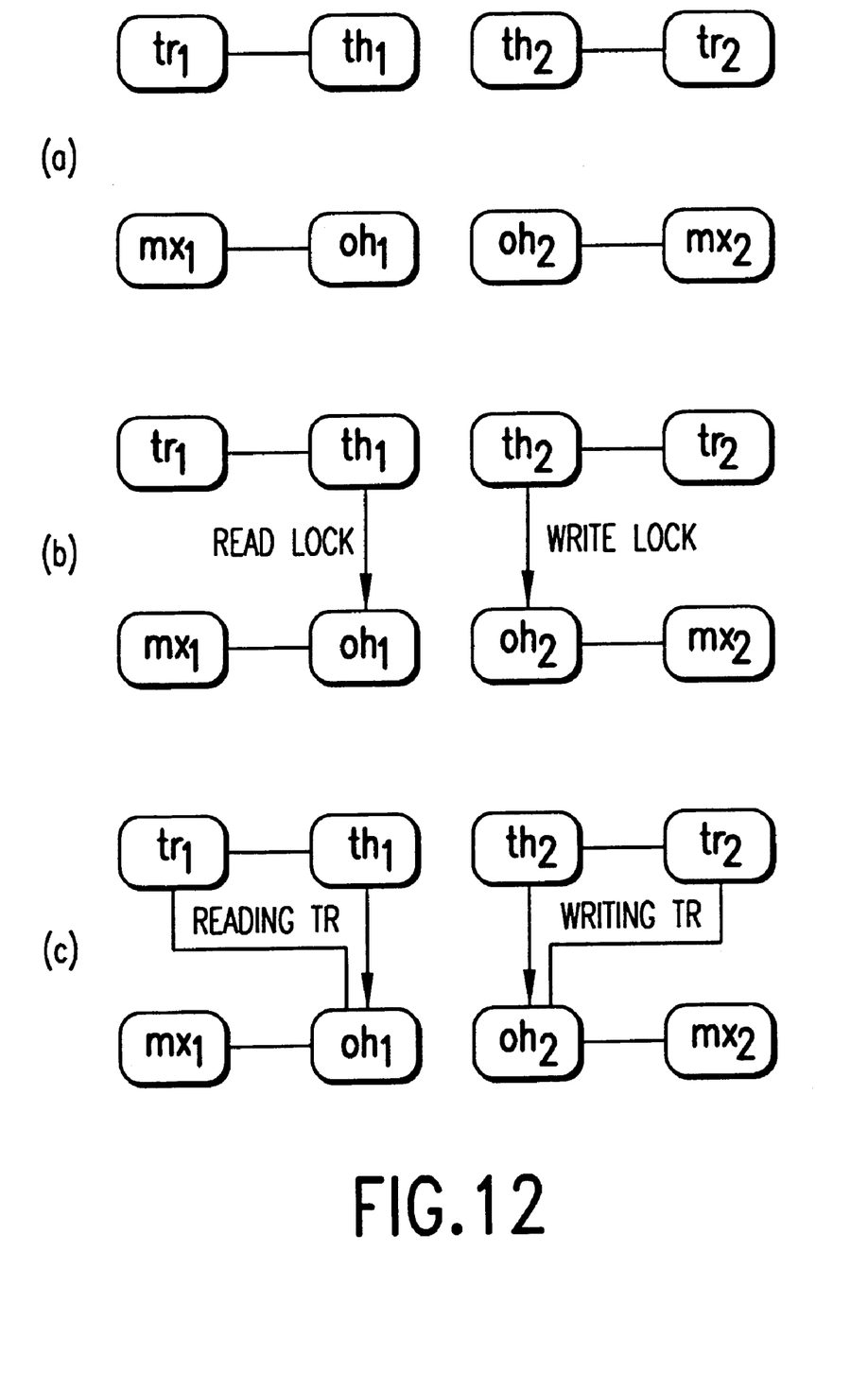
FIG. 12A shows the status prior to securing the lock.
FIG. 12B shows the status when the process to secure two threads starts simultaneously.
FIG. 12C shows the status when the lock for two threads is simultaneously secured.

Next, the operation during lock acquisition for a data object in this embodiment is shown by utilizing the example in FIG. 12.

Two thread objects are shown as th1 and th2 in FIG. 12. The transaction objects for these thread objects are shown as tr1 and tr2; the two objects (object handles) for performing exclusive control relating to the lock are shown as oh1 and oh2; and the two objects (Mutex) for synchronization of execution rights are shown as mx1 and mx2.

Status prior to lock acquisition is shown in FIG. 12(*a*). The two threads th1 and th2 operate in the process and the transactions tr1 and tr2 are present in each thread. Each of the threads th1 and th2 has handles oh1 and oh2 for controlling the data objects being operated, and Mutex objects mx1 and mx2 are associated for controlling execution rights relating to the data objects.

When from this status, the thread th1 attempts an exclusive read lock on the data objects controlled by the handle oh1, or when simultaneously with this attempt the thread th2 attempts a write lock on the data object controlled by the handle oh2, as shown in FIG. 12(*b*), then these two lock acquisition procedures are each performed as shown in FIG. 8. In other words, in the lock acquisition for the handle oh1 of the thread th1, the Mutex object mx1 controls the process execution and in the lock acquisition process for the handle oh2 of thread th2, the Mutex object mx2 controls the process execution.

In this way, the Mutex objects mx1 and mx2 execute independent control during the two lock acquisition processes without deadlocks occurring. Accordingly, a standby condition will not occur between the threads th1 and th2 during the function occupy( ) process for the objects mx1 and mx2. Consequently, the threads th1 and th2 will each quickly acquire execution rights and a lock can speedily be obtained on the transactions tr1 and tr2. Thus as shown in FIG. 12(*c*), not only does the thread th1 become capable of scanning (read-out) of the data object controlled by the handle oh1, but the thread th2 becomes capable of writing on the data object controlled by the handle oh2.

In the present invention therefore, when failure to secure a lock occurs as explained above, the thread execution rights of the transaction issuing the lock request are automatically discarded so that execution rights are then supplied to another thread and securing of a lock can be re-attempted. Therefore, in a database management system operating a plurality of application programs in a multi-thread environment, a plurality of threads can be efficiently operated in parallel and deadlocks will not occur between thread synchronization and exclusive control of transactions.

Also in the present invention, exclusive transaction control is performed for each thread so that when a plurality of threads are accessing a plurality of resources not dependent on exclusive control of transactions, execution rights can be speedily obtained for each thread without wasting time due to delays in standby and process parallel performance is improved.

What is claimed is:

1. A database management system for operation of a plurality of application programs in a multi-thread environment with a resource in a database handled as a cache resource on a virtual memory space, said system comprising:

a synchronization processor for securing an execution right to any thread relative to a cache resource; and an exclusive controller for securing a lock for a transaction operating on a thread for which an execution right is secured relative to a resource on a database corresponding to the cache resource;

said exclusive controller informs the synchronization processor of a failure in securing a lock when said exclusive controller fails to secure the lock requested by the transaction; and said synchronization processor, in response to the lock failure information, causes a previously secured execution right for a thread to be automatically canceled.

2. A database management system of claim 1, wherein the lock failure information includes identification information of a resource for which the lock has been attempted, and said synchronization processor automatically cancels the execution right of the thread for the resource for which the lock has been attempted.

3. A database management system of claim 2, wherein said synchronization processor stores in a synchronization secured stack the resource identification information corresponding to cache resources for threads whose execution rights are secured, and when the exclusive controller reports lock failure information, moves a target resource to be locked, from the top of the applicable synchronized stack to each thread that needs to be resecured and also automatically discards the execution rights of the thread to the resource that was moved, and said exclusive controller, after first securing by means of said synchronization processor the execution rights of the thread in the cache resource matching the resource among the threads that need to be resecured, once again secures a lock on the resource whose previous lock was a failure.

4. A database management system for enabling operation of a plurality of application programs in a multi-thread environment with a resource on a database handled as a cache resource on a virtual memory space, comprising:

a simultaneous processing function of securing an execution right to any thread relative to the cache resource; and an exclusive control function of securing a lock for a transaction operating on a thread for which an execution right is secured relative to the resource on the database corresponding to the cache resource;

said simultaneous processing function and said exclusive control function respectively constituted as a synchronized object and an exclusive control object, wherein said synchronized object exclusively secures an execution right to a thread by a unit of resource for which a lock is secured, and thereby said synchronized object and said exclusive control object execute exclusive control of the execution right and exclusive control of the lock on a one-to-one basis.

5. A database management system of claim 4, wherein when the thread makes a lock request to the resource as a transaction, said exclusive control object attempts a lock after obtaining execution rights only for the applicable resource by means of the synchronized object which has now been associated with the applicable resource by way of an applicable exclusive control object, and when the attempted lock is a failure, said synchronized object discards execution rights only for the applicable resource and when execution rights have once again been granted from other threads, said exclusive control object attempts said lock repeatedly.

6. A database management system of claim 5, wherein when thread execution rights have been discarded, said synchronized object reports to other threads that securing of execution rights is possible.

7. A database management method for operation of a plurality of application programs in a multi-thread environment with a resource in a database handled as a cache resource on a virtual memory space, said method comprising:

a synchronization step that secures an execution right to any thread relative to a cache resource;

an exclusive control step that attempts to secure a lock for a transaction operating on a thread for which an execution right is secured relative to a resource on a database corresponding to the cache resource; and a cancellation step that causes a previously secured execution right for a thread to be canceled when said exclusive control step fails to secure the lock requested by the transaction.

8. A database management method according to claim 7, wherein said exclusive control step includes an informing step that carries out the cancellation step when the exclusive control step fails to secure the lock requested by the transaction.

9. A database management method according to claim 8, wherein the informing step comprises identifying the resource for which the lock has been attempted during the exclusive control step.

10. A database management method according to claim 9, wherein said synchronization step comprises storing in a synchronization secured stack resource identification corresponding to cache resources for threads whose execution rights are secured.

11. A database management method according to claim 10, wherein, during the cancellation step, a target resource identified during the informing step is moved from a top of the stack to each thread that needs to be resecured.

12. A database management method according to claim 11, wherein, during the cancellation step, the execution right of the thread to the resource that was moved is discarded.

* * * * *